Figure 6:
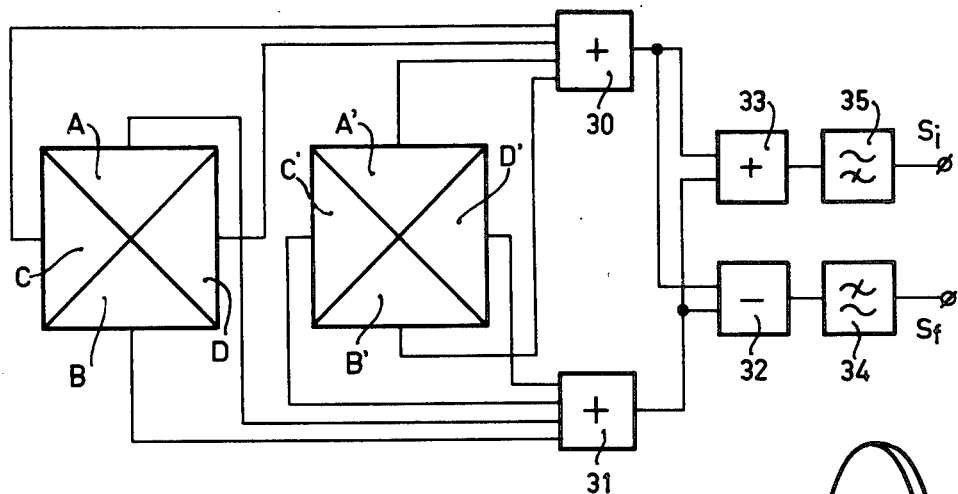

United States Patent [19]

Bouwhuis

[11] 4,123,652

[45] Oct. 31, 1978

[54] APPARATUS FOR READING A RADIATION-REFLECTING RECORD CARRIER

[75] Inventor: Gijsbertus Bouwhuis, Eindhoven, Netherlands

[73] Assignee: U.S. Philips Corporation, New York, N.Y.

[21] Appl. No.: 798,563

[22] Filed: May 19, 1977

[30] Foreign Application Priority Data

Mar. 22, 1977 [NL] Netherlands ..................... 7703077

[51] Int. Cl.$^2$ ............................................. G01J 1/36
[52] U.S. Cl. ........................... 250/204; 179/100.3 V; 358/128
[58] Field of Search ................ 179/100.3 V; 250/201, 250/204; 358/128

[56] References Cited

U.S. PATENT DOCUMENTS

| | | | |
|---|---|---|---|
| 3,719,421 | 3/1973 | Poilleux et al. | 250/201 X |
| 4,023,033 | 5/1977 | Bricot et al. | 250/201 |
| 4,025,949 | 5/1977 | Whitman | 358/128 |
| 4,059,841 | 11/1977 | Bricot et al. | 358/128 |

Primary Examiner—Lawrence J. Dahl
Attorney, Agent, or Firm—Frank R. Trifari; Simon L. Cohen

[57] ABSTRACT

An apparatus is described for reading a record carrier with an optical information structure, in which apparatus errors in the focussing of a read beam on the information plane are detected with an astigmatic focussing-error detection system.

By including a beam splitter in the path of a beam which has been reflected by the record carrier and by including an astigmatic focussing-error detection system in each of the paths of the two sub-beams thus obtained, the astigmatism of the one detection system being opposed to that of the other detection system, a focussing-error signal can be derived which is independent of optical faults in the read apparatus.

3 Claims, 14 Drawing Figures

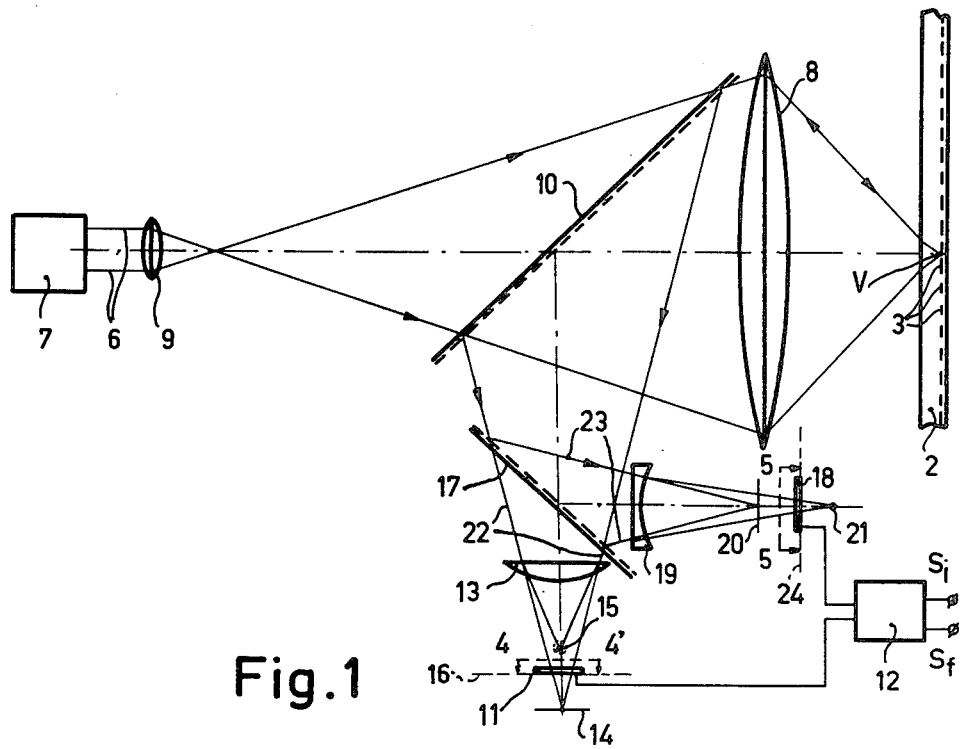
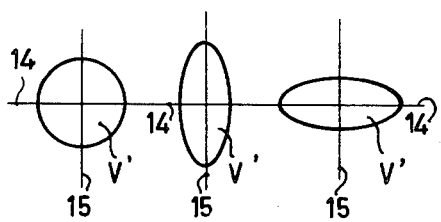
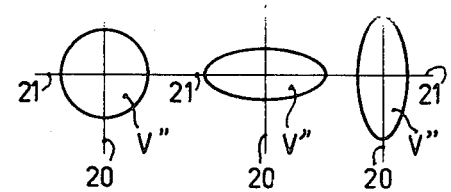
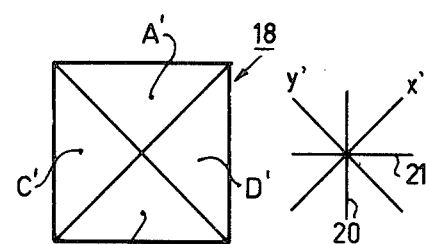

APPARATUS FOR READING A RADIATION-REFLECTING RECORD CARRIER

The invention relates to an apparatus for reading a radiation-reflecting record carrier on which information is stored in an optically readable track-wise arranged information structure, which apparatus comprises a radiation source which produces a read beam and an objective system for passing the read beam to a radiation-sensitive detection system via the record carrier. The detection system converts the read beam which has been modulated by the information structure into an electrical signal. At least one opto-electronic focussing error detection system for determining a deviation between the desired and the actual position of the plane of focussing of the objective system is also provided. The focussing error detection system comprises an astigmatic element and a radiation-sensitive detector. The detector comprises four sub-detectors which are disposed in four different quadrants of an imaginary X-Y co-ordinate system, the X and the Y axis being disposed at an angle of 45° with the astigmatic focal lines of the astigmatic element.

Such apparatus is described in the German Patent Application No. 2, 501, 124 which has been laid open for public inspection. This apparatus is for example employed for reading a record carrier on which a color television program is stored. The information structure then consists of a multitude of areas alternating with intermediate areas arranged in a spiral track, which areas and intermediate areas influence a read beam in different manners. The information is then for example contained in the lengths of the areas and those of the intermediate areas. In order to obtain a sufficiently long playing time with a record carrier of limited size, the details of the information structure have to be very small. For example, if a 30-minute television program is stored on one side of a disc-shaped round record carrier in an annular area with an outer radius of approx. 15 cm. and an inner radius of approx. 7 cm, the width of the tracks will be approx. 0.5 $\mu$m and the average length of the areas and of the intermediate areas will be approx. 1 $\mu$m.

In order to enable such minute details to be read an objective system with a fairly large numerical aperture is to be used. However, the depth of focus of such an objective system is small. As in the read-apparatus the variation in the distance between the plane of the information structure and the objective system may be greater than the depth of focus, provisions must be made so as to enable these variations to be detected and the focussing to be corrected.

In accordance with the said German Patent Application a radiation beam reflected by the record carrier is made astigmatic for this purpose, in that a cylindrical lens is included in the path of this beam behind the objective system. Between the focal lines of the astigmatic system formed by the objective system and the cylindrical lens, a radiation-sensitive detector which consists of four sub-detectors is disposed. When the position of the plane of the information structure varies relative to the objective system the shape of the image formed on the sub-detectors changes. This change in shape can be detected by combining the output signals of the four sub-detectors in the correct manner.

However, faults in the read apparatus may affect the radiation distribution on the focussing detector, so that the derived focussing error signal is also dependent on these faults.

When the various optical elements in the radiation path, such as the radiation source and the objective system, are not correctly aligned relative to each other, this results in a permanent asymmetry in the radiation distribution and thus in the image on the focussing error detector. In order to prevent this permanent asymmetry very stringent requirements would have to be imposed on the manufacturing tolerances of the apparatus. Permanent faults in the radiation disbribution may also be caused by optical faults in the elements in the radiation path, or by for example scratches on these elements.

In addition to the permanent faults temporary faults in the radiation distribution across the focussing error detector may occur, for example, owing to dust particles which have temporarily settled on an optical element in the radiation path or on the record carrier.

The position of the radiation spot formed on the record carrier relative to the position of a track portion to be read will also influence the radiation distribution of the focussing error detector.

It might be considered to remove the components in the focussing-error signal which are the result of the above-mentioned faults by electronic filtering. However, the servo-system for correcting the focussing of the objective system might then become unstable, unless the gain in this servo-system could be reduced. However, this is not readily attainable. Consequently, the focussing control signal supplied by the servo-system for correcting the focussing is also dependent on the above-mentioned faults.

When the focussing of the objective system is corrected by moving said system relative to the record carrier the temporary faults will manifest themselves as an annoying acoustic "rattling" of the objective system. Moreover, the drive mechanism of the objective system, for example an electro-magnetic coil, then consumes additional power, so that this coil will have to be larger. The optical faults result in incorrect focussing of the objective system.

It is an object of the present invention to produce a focussing-error signal in a read apparatus, which is dependent on the said spurious signals to the smallest possible degree. The apparatus in accordance with the invention is therefore characterized in that in the radiation path of a radiation beam which has been reflected by the record carrier, which path is separated from the path of the associated radiation beam which is directed towards the record carrier, a beam splitter is included which splits said reflected radiation beam into two sub-beams of substantially equal intensity, that in the radiation path of each of the sub-beams a focussing-error detection system is included, the astigmatism of the one focussing-error detection system being opposed to that of the other focussing-error detection system.

In the apparatus in accordance with the invention the focussing-error signals, which can be derived with the individual focussing-error detection systems, augment each other, while the spurious components in these focussing error signals are substracted from each other, so that the resulting spurious component becomes substantially zero.

For deriving a focussing error signal a separate beam of radiation may be used. Preferably, the focussing detection beam also constitutes the read beam, and the detectors of the focussing-error detection systems also constitute the detection system for reading the information on the record carrier.

Figure 7:
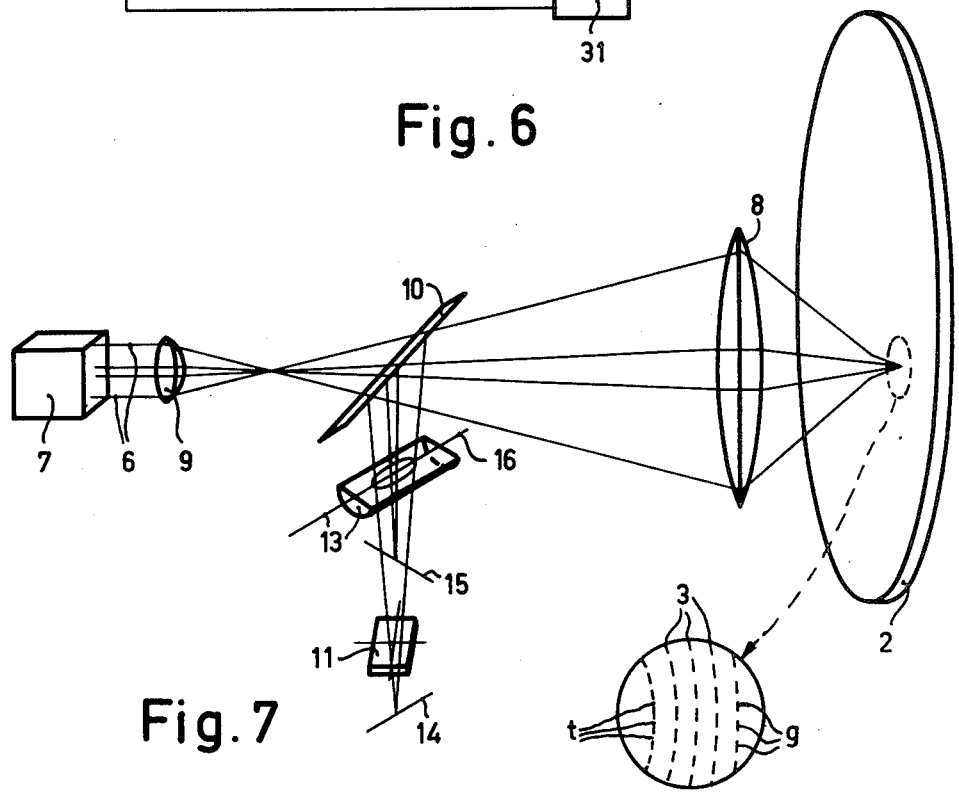

The invention will now be described in more detail with reference to the drawing, in which:

FIG. 1 shows a read apparatus in accordance with the invention,

FIGS. 2a, 2b, 2c, 3a, 3b and 3c illustrate the principle of the focussing error detection utilized in this apparatus, FIGS. 4 and 5 show the radiation-sensitive detectors employed in said apparatus, FIG. 6 schematically shows how the signals from these detectors are processed, FIG. 7 shows how the orientation of a focussing error detection system can be adapted so as to eliminate the influence of variations in the diffraction of the radiation beam, in a direction perpendicular to the track direction on the focussing error signal, and FIG. 8 shows the change in shape of the spot relative to the sub-detectors in the apparatus in accordance with FIG. 7.

FIG. 1 shows a part of a round disc-shaped record carrier 2 in cross-section. The information structure is for example a phase structure and comprises a multitude of concentric or quasi-concentric tracks 3, which tracks consist of a sequence of areas $g$ and intermediate areas $t$ (compare FIG. 7). The information may for example be a color television program, but alternatively other information such as a multitude of different images, or digital information.

The record carrier is illuminated by a read beam 6 which is obtained from a radiation source 7, for example a c.w. laser. An objective system, which for simplicity is represented by a single lens 8, focusses the read beam on the plane of the tracks S. The focal length of the auxiliary lens 9 has been selected so that the pupil of the objective system is adequately filled. The read beam is reflected by the record carrier and is then modulated in accordance with the information stored in a track portion to be read. For separating the incident (unmodulated) and the reflected (modulated) read beam, the radiation path includes a beam splitter 10, for example in the form of a partly transparent mirror. The beam splitter directs the modulated read beam towards a radiation-sensitive detector 11. This detector is connected to an electronic circuit 12 which derives a high-frequency information signal $S_i$ and, as will be explained hereinafter, a focussing error signal $S_f$ of lower frequency.

In order to enable focussing errors to be detected the radiation path behind the beam splitter 10 includes an astigmatic element 13. This element, as is shown in FIG. 1, may be a cylindrical lens. It is alternatively possible to make the beam astigmatic by for example arranging a plane transparent plate obliquely in the beam or by arranging a lens in the beam which is tilted relative to the beam.

Instead of one focus point an astigmatic system has two focal lines which, viewed in an axial direction, occupy different positions and are perpendicular to each other. Thus, the objective system and the cylindrical lens 13 add two focal lines 14 and 15 to the read spot V. In FIG. 1 the line 15 is perpendicular to the plane of drawing. The radiation-sensitive detector 11 is now disposed in the plane 16 between the lines 14 and 15. The plane 16 is preferably disposed at the location where the dimensions, in two mutually perpendicular directions, of the image spot added to the read spot V are equal to the highest as possible degree when the read beam 6 is correctly focussed on the plane of the information structure.

FIG. 2a shows the shape of the spot V' in the plane 16 where the objective system and the plane of the tracks are at the desired distance. In this Figure, and in FIGS. 2b and 2c, the directions of the focal lines 14 and 15 are indicated. If the distance between the plane of the tracks and the objective system is too great, the lines 14 and 15 will be disposed nearer the lens 13. The line 14 moves towards the plane 16 and the line 15 moves away from the plane 16, so that the spot V' will have the shape shown in FIG. 2c. If the distance between the objective system and the plane of the tracks is too small, the lines 14 and 15 will be disposed farther from the lens 13, and the shape of the spot V' will be as shown in FIG. 2b.

The detector 11 is a so-called quadrant-cell comprising four sub-detectors. FIG. 4 is a view in accordance with the line 4, 4' in FIG. 1. The four sub-detectors A, B, C and D are disposed in the individual quadrants of an X-Y co-ordinate system, whose orientation relative to the focal lines 14 and 15 is indicated in the left part of FIG. 4.

If the signals supplied by the sub-detectors A, B, C and D are represented by $S_A$, $S_B$, $S_C$ and $S_D$ respectively the focussing signal $S'_f$ supplied by the focussing-error detection system (13, 11) is defined by:

$$S'_f = (S_A + S_B) - (S_C + S_D).$$

It is evident that if the objective system and the plane of the tracks are at the desired distance from each other (the situation of FIG. 2a), the signal $(S_A + S_B)$ will equal the signal $(S_C + S_D)$, that for the situation of FIG. 2b the signal $(S_A + S_B)$ is greater than the signal $(S_C + S_D)$, and that for the situation of FIG. 2c the signal $(S_A + S_B)$ is smaller than the signal $(S_C + S_D)$. From the focussing-error signal $S'_f$ a focussing control signal can be derived electronically, in a manner known per se, which control signal for example enables the objective system to be moved.

In order to minimize the influence of optical faults on the eventual focussing control signal, the path of the radiation beam before the cylindrical lens 13 includes a beam splitter 17, in the form of a semi-transparent mirror. The beam splitter splits the radiation beam into two sub-beams 22 and 23 of equal intensity. The sub-beam 23 is also made astigmatic, in a similar way as the sub-beam 22, namely with the aid of the cylindrical lens 19. The combination of the objective system 8 and the cylindrical lens 19 provides two focal lines 20 and 21 of which the focal line 20, as well as the focal line 14, are disposed in the plane of drawing, while the focal line 21, as well as the focal line 15, are disposed at right angles to the plane of drawing. Steps have been taken to assure that the astigmatism of the system 18, 19 is opposed to that of the system 8, 13. This can be achieved, as is shown in FIG. 1, by using a positive lens for the cylindrical lens 13 and a negative lens for the cylindrical lens 19. In FIG. 1 the focal line 21 is disposed in the radiation path after the focal line 20, while the focal line 15 is disposed before the focal line 14.

Alternatively, the cylindrical lenses 13 and 19 may both be positive lenses. In order to assure that the systems 8, 13 and 8, 19 have an opposite astigmatism, the cylinder axes of the lenses 13 and 19 should then be perpendicular to each other.

A second radiation-sensitive detector 18, which is again a quadrant-cell, is disposed in the plane 24 between the focal lines 20 and 21. The shape of the spot V" on the detector 18 again depends on the degree of focussing of the radiation beam 6 on the plane of the tracks, but the change in shape of V" as a function of the focussing is opposed to the change in shape of the spot V'.

FIG. 3a shows the shape of the spot V" if the objective system and the plane of the tracks are at a correct distance from each other. In this Figure, and in FIGS. 3b and 3c, the directions of the focal lines 20 and 21 are also indicated. If the distance between the objective system and the plane of the tracks is too great, the focal lines 20 and 21 will be nearer the lens 19. The focal line 21 then moves towards the plane 24 and the focal line 20 moves away from the plane 24, so that the spot V" will have the shape of FIG. 3c. If the distance between the objective system and the plane of the tracks is too small, the focal lines 20 and 21 will be disposed farther from the lens 19 and the spot V" will have the shape shown in FIG. 3b.

FIG. 5 is a view of the detector 18 in accordance with the line 5, 5' in FIG. 1. The detector 18 again comprises four sub-detectors A', B', C' and D' which are disposed in different quadrants of an X'-Y' co-ordinate system. In the right-hand part of FIG. 5 the orientation of this co-ordinate system relative to the focal lines 20 and 21 is shown. It is to be noted that the co-ordinate system X', Y' is disposed in the sub-beam 23 in a similar way as the co-ordinate system X-Y in the sub-beam 22.

It is now obvious that if the distance between the objective system and the plane of the tracks is too great, the focussing error signal $S''_f$ which is derived with the detector 18, i.e. the signal $S''_f = (S_{A'} + S_{B'}) - (S_{C'} + S_{D'})$ is positive, while the signal $S'_f$ from the detector 11, is then negative. If the distance between the objective system and the plane of the tracks is too small, it is obvious that the reverse applies.

In accordance with the invention the signals from the eight sub-detectors are combined in such a way that the signals $S'_f$ and $S''_f$ augment each other. FIG. 6 schematically shows how the detector signals are processed. The signals from the detectors A and B are added to those from the detectors C' and D' in the adding circuit 31. In the adding circuit 30 the signals from the detectors C and D are added to those from the detectors A' and B'. The output signals of the adding circuits 30 and 31 are applied to the subtracting circuit 32, whose output is connected to a low-pass filter 34, which for example transmits frequencies up to some tens of kHz. At the output of the filter 14 the signal $S_f$ is obtained, which is represented by:

$$S_f = (S_A + S_B + S_C + S_D) - (S_{A'} + S_{B'} + S_{C'} + S_{D'}).$$

If the signal $S_f$ is positive, the distance between the objective system and the plane of tracks is too small. If the distance between the objective system and the plane of tracks is too great the signal $S_f$ is negative, while $S_f$ equals zero when this distance is correct. The focussing-error signal $S_f$ can now be processed into a focussing control signal with which the focussing of the objective system can be corrected, for example by moving the objective system relative to the plane of the tracks.

Instead of applying the signal from the eight sub-detectors directly to the adding circuits 30 and 31, as is shown in FIG. 6, it is possible first to combine two signals at a time, i.e. $S_A$ and $S_B$, $S_C$ and $S_D$, $S_{A'}$ and $S_{B'}$, and $S_{C'}$ and $S_{D'}$, and then to apply them to the adding circuits 30 and 31 via potentiometers. During assembly of the read apparatus the focussing error detection systems can then be adjusted to zero by means of the potentiometers. It is then, for example, possible to compensate for the fact that the sub-beams 22 and 23 have not exactly the same intensity.

When owing to the optical faults the distribution of radiation across the sub-detectors A, B, C and D varies, the distribution of the radiation across the sub-detectors B', A', D' and C' respectively varies in a similar manner owing to the opposite astigmatism. Since the signals from the corresponding sub-detectors are substracted from each other for deriving the focussing signal $S_f$, i.e. the signal $S_{B'}$ is subtracted from the signal $S_A$, the signal $S_{A'}$ from the signal $S_B$ etc., the influence of optical faults on the focussing signal $S_f$ is eliminated.

By means of the radiation beam 6 which is employed for deriving the signal $S_f$ the high-frequency information which is stored on the record carrier 2 can also be read. For this purpose the signals from all eight sub-detectors are for example added to each other. In the circuit in accordance with FIG. 6 this is effected by applying the output signals of the adding circuits 30 and 31 to the adding circuit 33. The last-mentioned circuit is connected to a high-pass filter 35, which for example only transmits signal components with a frequency higher than 100 kHz. The output signal $S_i$ corresponds to the information on the record carrier. This signal can be decoded in a manner known per se and can subsequently be applied to a conventional television receiver. The above-mentioned optical faults have virtually no influence on the information signal $S_i$, because the frequencies of these faults are below the cut-off frequency of the filter 35.

In the simultaneously filed U.S. Patent Application Ser. No. 798,500 filed May 19, 1977 it is set forth that a substantial fault in the focussing error signal which is derived with the aid of one astigmatic focussing-error detection system may occur, if the center of the radiation spot V moves from the center of a track to be read towards the edge of said track. This gives rise to a variation in the diffraction of the radiation beam by a track, namely in a direction perpendicular to the track direction. This variation gives rise to a variation of the radiation distribution across detectors of the focussing-error detection system. In order to avoid this problem the prior U.S. Patent Application proposes to orient the sub-detectors in such a way that one of the axes of the X-Y co-ordinate system is parallel to the "effective track direction". The "effective track direction" is the projection of the track portion to be read on the plane of the sub-detectors.

The steps in accordance with the present Application may then be combined with that of the cited U.S. Patent Application. A read apparatus is then obtained with two astigmatic focussing-error detection systems, one of the co-ordinate axes of each of the composite detectors being parallel to the effective track direction.

For the sake of completeness, FIG. 7 shows for one focussing error detection system with adapted orientation of the co-ordinate axes, how this system can be arranged in the read apparatus.

Figures 8A, 8B, 8C:
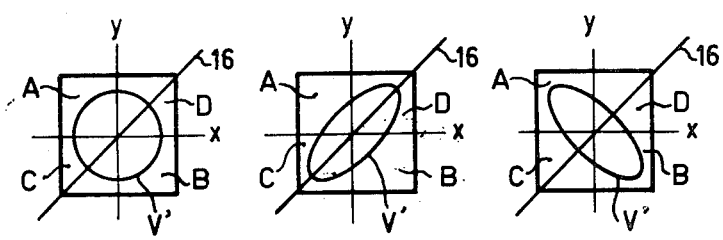

FIGS. 8a, 8b and 8c show how the shape of the spot V' changes relative to the sub-detectors A, B, C and D. The situations represented in FIGS. 8a, 8b and 8c correspond to those represented in FIGS. 2a, 2c and 2b respectively.

When the two focussing-error detection systems of FIG. 1 are adapted in accordance with FIG. 7, the signals from the eight sub-detectors can be processed in the manner illustrated in FIG. 6. A focussing-error signal is then obtained in which the influence of optical faults in general, and the influence of the position of the radiation spot V relative to a track to be read in particular, is eliminated.

What is claimed is:

1. Apparatus for reading a radiation-reflecting record carrier on which information is stored in an optically readable information structure arranged in tracks, comprising a radiation source means for producing a read beam of radiation, an objective system means for focussing the read beam on the record carrier, whereby the record carrier modulates said read beam, a radiation-sensitive information detection system in the path of the modulated read beam for converting the modulated read beam into an electrical signal, means for directing the modulated radiation beam from the record carrier along a path separated from the read beam provided by the radiation source means, a beam splitter means in the separate path for dividing the modulated beam from the record carrier into two sub-beams of substantially equal intensity, a first astigmatic element in the path of one of the sub-beams, a second astigmatic element in the path of the other of said sub-beams, the astigmatism of the first astigmatic element being opposed to that of the second astigmatic element, a first detector assembly of four sub-detectors in the path of the first sub-beam from the first astigmatic element, said sub-detectors of the first detector assembly being disposed in four different quadrants of an imaginary X–Y co-ordinate system, the X and Y axes being disposed at an angle of 45° with respect to the astigmatic focal lines of the first astigmatic element, a second detector assembly of four sub-detectors in the path of the second sub-beam from the second astigmatic element, said sub-detectors of the second detector assembly being disposed in four different quadrants of an X–Y co-ordinate system, the X and Y axes of the co-ordinate system of said second detector assembly being disposed at an angle of 45° with the astigmatic focal lines of the second astigmatic element.

2. An apparatus as claimed in claim 1, wherein the first and the second detector assemblies also constitute the information detection system.

3. Apparatus as claimed in claim 1, wherein one of the co-ordinates axes of each of the detector assemblies is parallel to the effective track direction.

* * * * *